Figure 1:
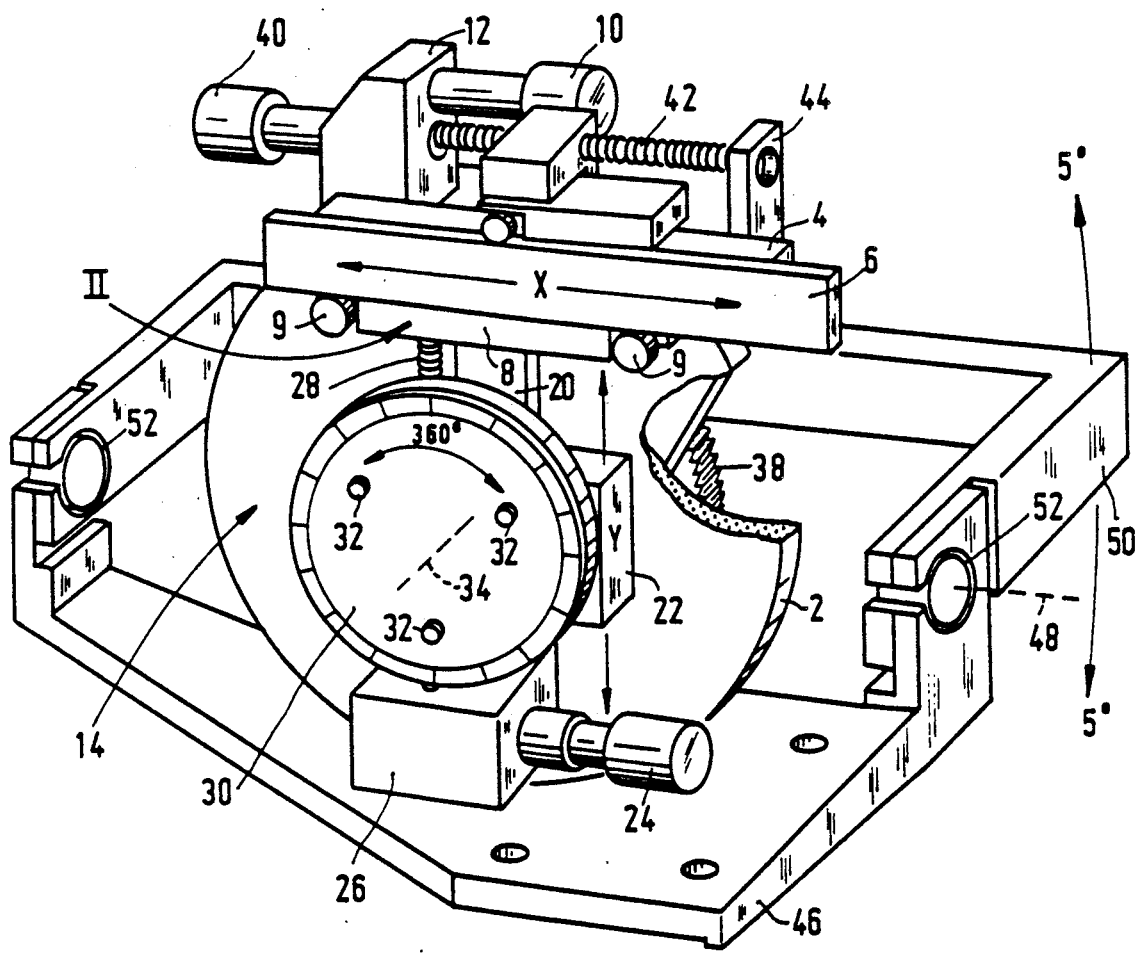

United States Patent [19]

Boksem

[11] Patent Number: 5,001,351
[45] Date of Patent: Mar. 19, 1991

[54] OBJECT HOLDER FOR POSITIONING AN OBJECT IN A RADIATION BEAM

[75] Inventor: Jaap Boksem, Almelo, Netherlands

[73] Assignee: U.S. Philips Corporation, New York, N.Y.

[21] Appl. No.: 447,964

[22] Filed: Dec. 7, 1989

[30] Foreign Application Priority Data

Dec. 19, 1988 [NL] Netherlands ............ 8803101

[51] Int. Cl.⁵ ............................................. G21K 5/10
[52] U.S. Cl. ................................ 250/442.1; 250/440.1
[58] Field of Search ............................ 250/442.1, 440.1

[56] References Cited

U.S. PATENT DOCUMENTS

| | | | |
|---|---|---|---|
| 3,629,577 | 12/1971 | Weber et al. | 250/442.1 |
| 3,678,270 | 7/1972 | Braun et al. | 250/442.1 |
| 4,310,764 | 1/1982 | Iijima | 250/442.1 |
| 4,627,009 | 12/1986 | Holmes et al. | 250/442.1 |
| 4,684,315 | 8/1987 | Sugishima et al. | 250/442.1 |

*Primary Examiner*—Bruce C. Anderson
*Attorney, Agent, or Firm*—William Squire

[57] ABSTRACT

In an object holder comprising an X-Y translation mechanism, both movements are determined by transporters which are separately moved across a supporting face of a supporting plate under a pressure in a sliding fashion. The pressing force is preferably realized by means of permanent magnets which are mounted on the transporters and which bear on the supporting face of the supporting plate by way of preferably ductile spacers. A device for rotation and/or tilting can be simply added by rotating and/or tilting the entire supporting plate with the X-Y translation mechanism.

12 Claims, 1 Drawing Sheet

OBJECT HOLDER FOR POSITIONING AN OBJECT IN A RADIATION BEAM

The invention relates to an object holder for positioning an object in a radiation beam, comprising an X-Y translation mechanism.

In known object holders an X-Y translation mechanism is constructed so that an X-transporter for translation in an X-direction carries a carriage for translation across the X-transporter in an Y-direction, the X-transporter acting as a reference and supporting face for the Y-transporter or vice versa. This results in a comparatively complex translation mechanism where errors in the second translation constitute a sum of errors in both translation systems and where an undesirable rotary movement and tilting can readily occur during the last translation motion. This is understandable because, considering the desirable low-friction movements, it is difficult to prevent a given play for each of the guides. This is extremely undesirable, however, in object carriers where angular orientation of an object is co-decisive for the accuracy of measurements to be performed.

It is the object of the invention to mitigate these drawbacks.

In accordance with the present invention each of two translatory movements separately refers directly to a supporting face of a supporting plate in a translation mechanism. A simple and inexpensive movement mechanism exhibited extremely accurate positioning, notably because of a force coupling, which minimizes undesirable rotation and tilting.

In a preferred embodiment in accordance with the invention the pressure exerted towards the supporting plate is realized by a magnetic force of attraction, by means of permanent magnets, for example, which are coupled to an X-transporter and to a support for the object table, which magnets preferably bear on the supporting face of the supporting plate via an intermediate spacer which are preferably ductile to some extent. In addition to a smooth sliding contact, a desirable air gap is thus also achieved.

In a further preferred embodiment, a rotation of the object table is added to the X-Y translation; this is comparatively simply achieved by mounting the supporting plate so as to be rotatable about an axis extending transversely of its supporting face. Driving can be realized by mounting a motor-driven rotation mechanism on a rear side of the supporting plate (with respect to the object table), the axis of rotation preferably extending through the centre of a substantially circular supporting plate.

An object tilting mechanism for tilting the supporting face of the supporting plate can also be added to the supporting plate. If the angles of tilt need not be very large, for example no more than approximately plus and minus 10°, use can be made of a shaft in the form of a cylindrical bush which is partly open in the lateral direction, so that at that area a free passage is realized for a radiation beam extending parallel to the supporting plate.

Figure 1A:
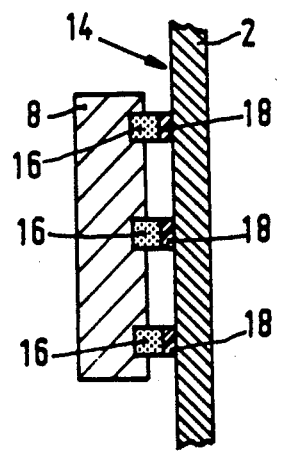

Some preferred embodiments in accordance with the invention will be described in detail hereinafter with reference to the drawing. In the drawing, FIG. 1 shows an object holder in accordance with one embodiment of the invention whereto a rotation mechanism as well as a tilting device. FIG. 1A is a sectional view of a portion of the embodiment of FIG. 1 showing a representative coupling of the x-translator to a support plate.

An object holder as shown in the FIG. 1 comprises a supporting plate 2 on which an X-guide 6 is mounted, preferably by way of a bracket 4 connected to the rear side. An X-transporter 8 is displaceable along the X-guide, for example in known manner by means of rollers 9, over a distance of up to, for example 50 mm or more. The X-transporter 8 is driven by a motor 10 via a transmission 12. In order to save space, the motor 10 is arranged parallel to the X-guide, but this is irrelevant for the invention. On a side which faces the supporting plate 2, FIG. 1A the X-transporter 8 is provided with preferably three magnets 16 (for kinematic reasons), which magnets bear on the supporting plate via intermediate spacers 18 and are pressed against the supporting plate by the magnetic force produced by the magnets. It is thus achieved that the X-transporter always moves exactly parallel to the supporting face 14. The flatness of the supporting plate 2 at the area of the supporting face determines the accuracy of displacement. Such a plate, being made of a magnetic material in order to realize the magnetic pressing force, can be worked so as to be flat in an extremely accurate as well as comparatively inexpensive manner. A layer against corrosion of notably the supporting face can be locally provided. If desirable, in order to achieve an adjustable pressing force use can also be made of magnets to be energized by coils, a minimum energization being substained in order to prevent the transporter from coming loose from the supporting plate; this can alternatively be ensured by a permanent sub-magnet. The X-transporter supports an Y-guide 20 for guiding an Y-transporter 22 which is displaceable along the Y-guide, via wheels (not shown), in exactly the same way as the X-transporter. The Y-transporter is also pressed against the supporting face 14 of the supporting plate 2 by way of magnets 16 and spacers 18 (not separately shown). Therefore, also the Y-transporter will always move parallel to the supporting face 14 and rotation or tilting errors will not be summed. Rotations about an axis transversely of the supporting plate are determined as a function of the degree of straightness of the guides; such straightness can also be comparatively simply realized. The Y-transporter is driven by a motor 24 which drives a spindle 28 via a transmission 26. The Y-transporter supports an object table 30 on which an object, for example a wafer can be mounted, for example on supporting points 32.

In the embodiment shown the object table 30 is rotatable about an axis 36 extending transversely of the supporting face 14. To this end, the supporting plate supports a gearwheel 38 which is driven by a motor 40, via a spindle 42 which is supported by a holder 44 and which realizes a rotation of, for example up to 360°. As a result of this construction, an object arranged on the object table can be rotated into any desirable X-Y position in the radiation beam path. To this end, the rotary shaft 34 of the supporting plate is connected to a support 46 for the object holder. Via this support, the object holder can be mounted on or in an apparatus, for example an X-ray analysis apparatus, a wafer inspection apparatus and the like. When the object table is mounted so as to be tiltable about an axis 48 parallel to the supporting face as shown, the rotary shaft 34 is coupled via a bracket 50. Using a drive motor not shown, the bracket 50 is tiltable, together with the supporting table and the X-Y translation mechanism, through an angle of, for example plus and minus 10° with respect to a vertical zero position of the supporting plate. In order to offer free passage to a radiation beam, bushes 52 for tilting are provided with lateral apertures 54. An object carrier in accordance with the invention can be successively used in X-ray analysis apparatus, in wafer inspection apparatus and the like where an object carrier of the described kind can be mounted on or in such an apparatus by means of the support 46. An object to be examined may then also be accommodated in a space to be evacuated.

I claim:

1. An object holder for positioning an object in a radiation beam comprising:

a base;

means for securing a plate member to the base, said plate member having a planar face surface;

an X-guide movably secured to the base and translatable in X-directions relative to said plate member, said guide including first slide means for sliding in abutting relation on said face surface in said X-directions; and a Y-guide secured to the X-guide and translatable in Y-directions, said Y-guide including second slide means for sliding in abutting relation on said face surface in said Y-directions;

one of said guides including means to receive said object to be positioned in said radiation beam.

2. The object holder of claim 1 wherein said X-guide includes an X-transporter and means for securing the first slide means to the X-transporter and the Y-guide includes a Y-transporter and means for securing the second slide means to the Y-transporter.

3. An object holder as claimed in claim 2, including permanent magnets which are secured to the X-transporter and to the Y-transporter and which magnets bear on the supporting face of the supporting plate via intermediate sliding pieces.

4. An object holder as claimed in claim 1, further including a rotation mechanism for rotating the supporting plate about an axis extending transversely of the supporting face thereof.

5. An object holder as claimed in claim 4, characterized in that rotation has an extent of at least 360°.

6. An object holder as claimed in claim 1, further including a tilt mechanism for tilting the supporting plate about an axis extending parallel to the supporting face thereof.

7. An object holder as claimed in claim 6, characterized in that said tilt mechanism includes a plurality of bushings for providing a tilting movement, said bushings having cut-outs which act as passages for a radiation beam.

8. The object holder of claim 1 wherein said first and second slide means each include magnet means for magnetically forcing the X and Y slide means in said abutting relations.

9. The object holder of claim 8 wherein said magnet means are permanent magnets, said sliding means each including sliding members intermediate said magnets and said face surface.

10. The object holder of claim 1 wherein said Y-guide is to receive said means adapted to receive said object.

11. An object holder for positioning an object in a radiation beam comprising:

a base;

means for securing a plate member to the base, said plate member having a planar face surface;

an X-guide movably secured to the base and translatable in X-directions relative to said plate member;

an X-transporter secured to said guide;

first slide means secured to the X-transporter for sliding in abutting relation on said face surface in said X-directions;

a Y-guide secured to the X-transporter and translatable in Y-directions;

a Y-transporter secured to said Y-guide;

second slide means secured to the Y-transporter for sliding in abutting relation on said face surface in said Y-directions; and means for rotatably securing an object support table to said Y-guide.

12. The object holder of claim 11 wherein said first and second slide means each include magnet means and ductile interface means, said magnet means being secured to said transporters and said ductile means being secured to said magnet means intermediate said magnet means and said face surface, said ductile means for sliding on said face surface.

* * * * *